(12) United States Patent
Yamamoto

(10) Patent No.: US 6,204,616 B1
(45) Date of Patent: Mar. 20, 2001

(54) CRT DRIVING CIRCUIT

(75) Inventor: Kazuhiko Yamamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/105,098

(22) Filed: Jun. 25, 1998

(30) Foreign Application Priority Data

Jun. 27, 1997 (JP) .................................................. 9-005560

(51) Int. Cl.⁷ .................................................. H01J 29/70
(52) U.S. Cl. .......................................... 315/411; 315/386
(58) Field of Search .................................... 315/411, 386; 363/21, 56, 20, 55, 97; 361/186, 190, 194

(56) References Cited

U.S. PATENT DOCUMENTS

| 4,468,715 | * | 8/1984 | Reno, Jr. ................. | 361/186 |
| 4,985,665 | * | 1/1991 | Sendelweck .............. | 315/368 |
| 5,995,385 | * | 11/1999 | Shimamura ............... | 363/21 |

FOREIGN PATENT DOCUMENTS

| 01149577 | * | 6/1989 | (JP) | ................. | H04N/3/18 |
| 07231654 | * | 8/1995 | (JP) | ................. | H02M/3/338 |
| 10341576 | * | 12/1998 | (JP) | ................. | H02M/3/338 |

* cited by examiner

*Primary Examiner*—Seungsook Ham
*Assistant Examiner*—Shun Lee
(74) *Attorney, Agent, or Firm*—Lackenbach Siegel Marzullo Aronson & Greenspan

(57) ABSTRACT

A CRT driving circuit includes a cathode control circuit for controlling a cathode voltage of a CRT on the basis of a video signal created by a video circuit, a power supply circuit for creating a power supply voltage for each of the cathode control circuit and the video circuit, a switch circuit provided between the power supply circuit and the cathode control circuit, and a monitor control circuit for on/off controlling the switch circuit and the power supply circuit on the basis of a power-on/off externally inputted signal. In response to the power-on/off signal, when the monitor control circuit switches the switch circuit and the power supply circuit into an off-state, it turns off the power supply circuit later than the switch circuit. Even after a power-switch is turned off, the video signal is supplied to the cathode control circuit so that the cathode control circuit continues its on-state. Thus, the charges left in the CRT while the power-switch is turned off are discharged through the cathode control circuit in the on-state.

6 Claims, 2 Drawing Sheets

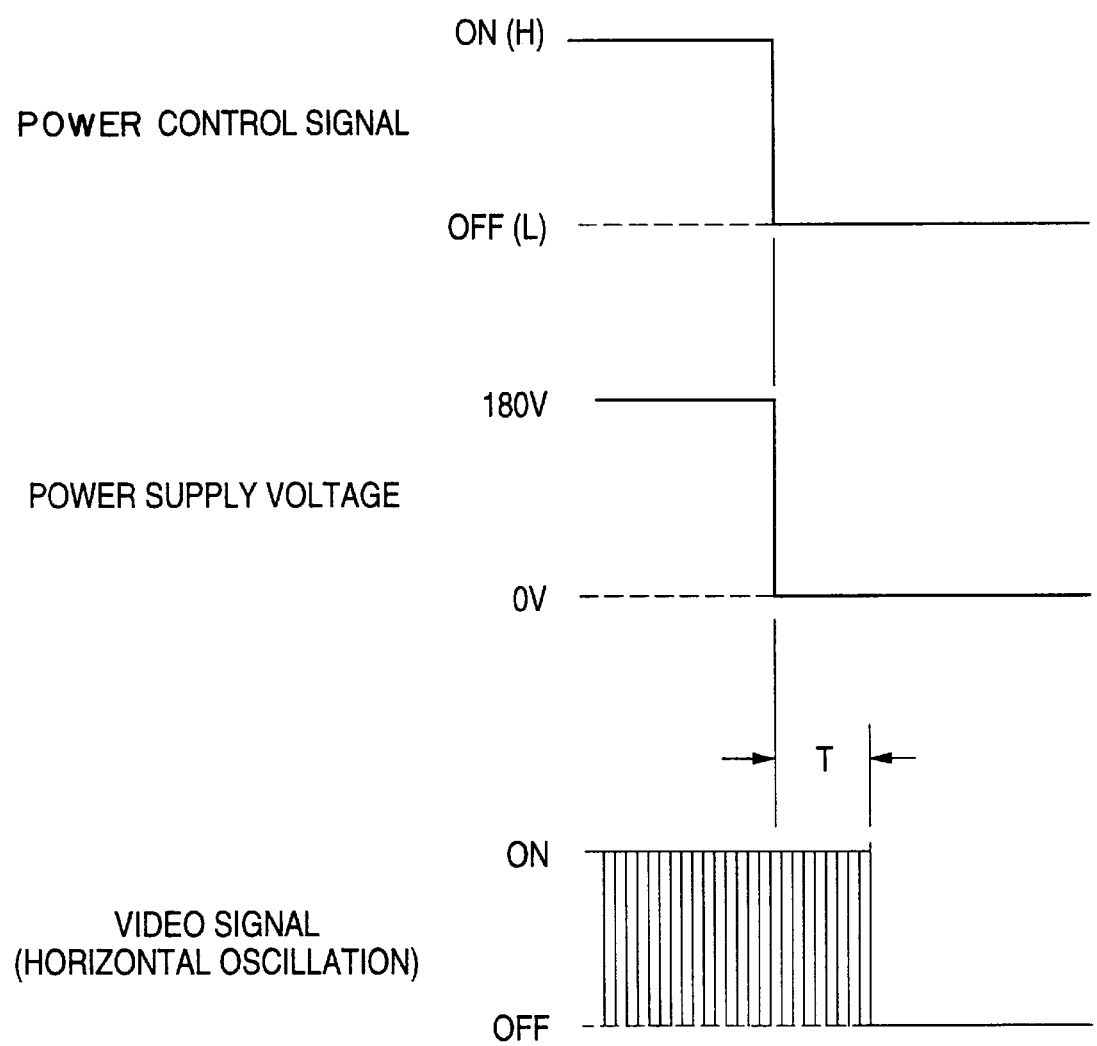

CRT DRIVING CIRCUIT

BACKGROUND OF THE INVENTION

1. Field of the Invention

The present invention relates to a CRT driving circuit used in a display device using a CRT in a television set or a television set equipped with a video cassette recorder, and more particularly to a CRT driving circuit used to drive the cathode of the CRT.

2. Description of the Related Art

It is well known that with respect to the CRT of a television set or a television set equipped with a video cassette recorder, a monitor screen still illuminates in white spots even after a power switch is turned off. It is said that such a phenomenon, called "remaining spot" or "stray emission", is attributable to a remaining high voltage because electrons are left in the CRT after the power switch is turned off.

This remaining spot impairs the display as a commodity product. In order to obviate such an inconvenience, conventionally, when the power switch is turned off, a so-called "full white" video signal is been applied to a cathode control circuit of the CRT so that the entire screen illuminates in white, and thereafter a power supply circuit is turned off.

However, such a countermeasure does not discharge the high voltage left in the CRT after the power switch is turned off so that it is only a temporary means for making the remaining spot unattractive, not a substantial solution of the inconvenience. In addition, such a countermeasure places the CRT in an excessively loaded state due to the full white image and hence is not preferred to the CRT.

SUMMARY OF THE INVENTION

An object of the present invention is to provide a CRT driving circuit which can essentially cancel the remaining spot by means of discharging the high voltage of a CRT in a simple circuit configuration when a power switch is turned off.

In order to achieve the above object, the invention provides a CRT driving circuit comprising: a cathode control circuit for amplifying a video signal created by a video circuit and supplying the amplified video signal to a cathode of a CRT; a power supply circuit for creating a power supply voltage for each of the cathode control circuit and the video circuit; a switch circuit for switching on/off the power supply voltage outputted from the power supply circuit to the cathode control circuit; and a monitor control circuit for on/off controlling the switch circuit and the power supply circuit on the basis of a power-on/off signal externally inputted and switching off from on the power supply circuit at a timing later than the switch circuit is switched off when the power-off signal is inputted.

BRIEF DESCRIPTION OF THE DRAWINGS

FIG. 2 is a timing chart of a power control signal, a power supply voltage and a video signal showing the operation of the CRT driving circuit.

DETAILED DESCRIPTION OF THE PREFERRED EMBODIMENT

Figure 1:
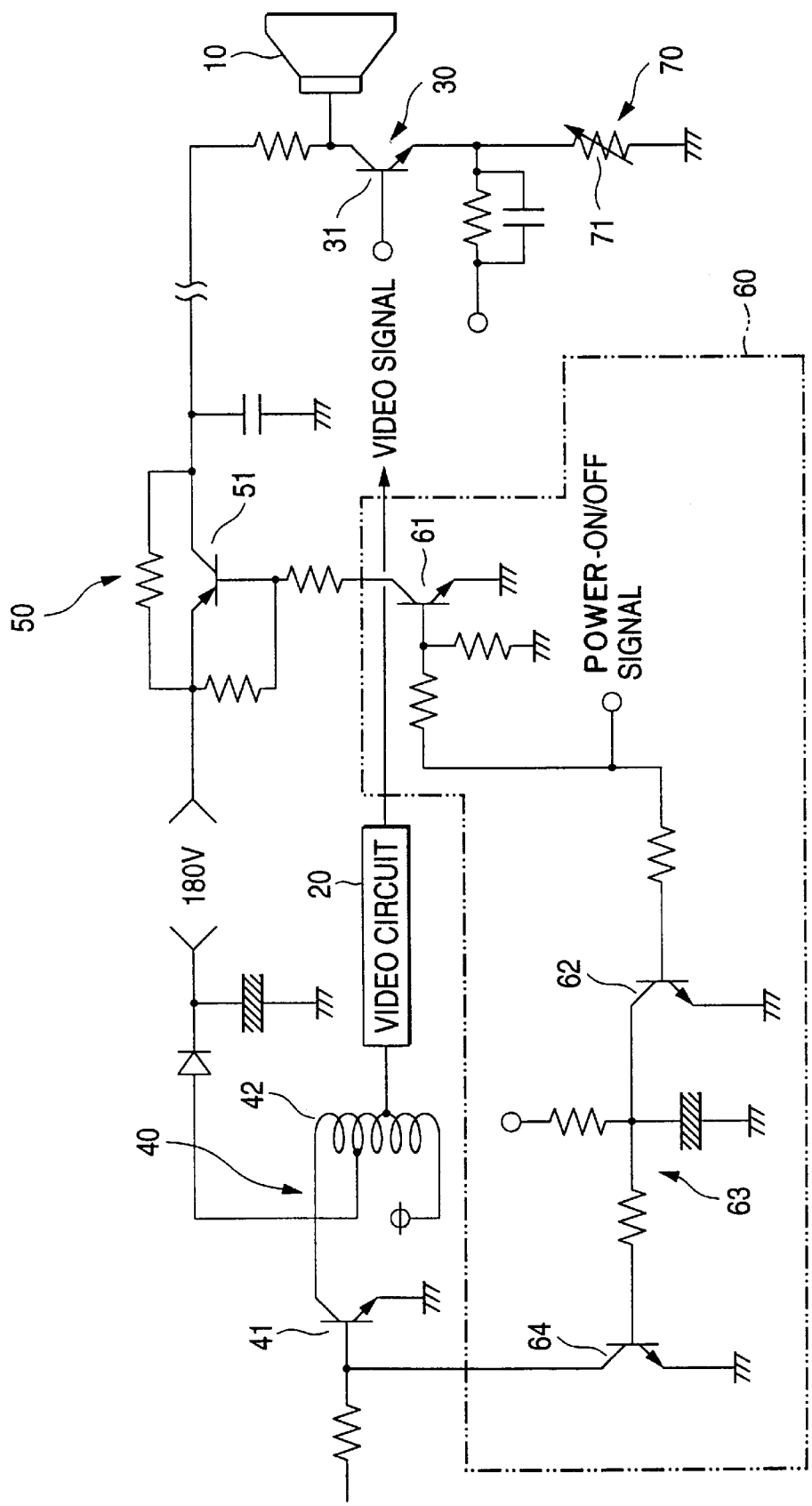
FIG. 1 is a circuit diagram of a CRT driving circuit according to an embodiment of the present invention.

Now referring to the drawings, an explanation will be given of an embodiment of the present invention. FIG. 1 is a circuit diagram of a CRT driving circuit, and FIG. 2 is a timing chart showing the operation of the CRT driving circuit.

The CRT driving circuit according to this embodiment, as shown in FIG. 1, is used to drive the cathode of a CRT 10 installed in a television set equipped with a video cassette recorder. The CRT driving circuit includes a cathode control circuit 30 for amplifying a video signal created by a video circuit 20 and supplying the amplified video signal to the cathode of the CRT 10; a power supply circuit 40 for creating the power supply voltage for each of the cathode control circuit 30 and video circuit 20; a switch circuit 50 provided between the output side of the power supply circuit 40 and the voltage supply side of the cathode control circuit 30; a monitor control circuit 60 for on/off controlling the switch circuit 50 and power supply circuit 40 on the basis of a power-on/off signal externally inputted; and a discharging circuit 70 provided on the ground side of the cathode control circuit 30.

The power supply circuit 40 may be a switching power supply of a ringing choke converter (RCC) type using a transistor 41 and a transformer 42. For example, the power supply circuit 40 creates a power supply voltage of 180 V and applies it to the cathode control circuit 30.

The cathode control circuit 30 is constructed using a transistor 31 with its emitter grounded. The transistor 31 controls the voltage applied to its collector in accordance with the level of the video signal (horizontal oscillation) inputted to its base so that the voltage of the cathode connected to the collector is controlled in a range from 150 V (black) to 120 V (white). The discharging circuit 70 provided on the ground (emitter) side of the cathode control circuit 30 connects the emitter to ground through a variable resistor 71. Incidentally, the video circuit 20, when the power supply circuit 40 is in an on-state, applies a video signal (on-signal) to the cathode control circuit 30.

The switch circuit 50 is constructed using a transistor 51 with its base grounded. The monitor control circuit 60 includes two transistors 61 and 62 which are controlled on the basis of a power control signal (power-on/off signal) supplied from a microcomputer. The one transistor 61 (first switching element) controls the base voltage of the transistor 51 within the switch circuit 50 so that the switch circuit 50 is turned on/off. The other transistor 62 on/off controls a transistor 64 (second switching element) through an RC circuit 63 which is a time constant circuit so that the transistor 41 within the power supply circuit 40 is turned on/off.

Next, referring to FIG. 2, an explanation will be given of the operation of the CRT driving circuit according to this embodiment.

In the power control circuit 60, when the power control signal is an on-signal (H), the transistors 61 and 62 within the monitor control circuit 60 are turned on. When the transistor 61 is turned on, the transistor 51 within the switch circuit 50 is turned on. When the transistor 62 is turned on, the transistor 64 is turned off and the transistor 41 within the power supply circuit 40 is turned on. Thus, the power supply voltage level of the cathode control circuit 30 becomes H (180 V). The video circuit 20 is also turned on to create a video signal and supplies it to the cathode control circuit 30. In this way, the CRT 10 makes monitor display.

When the power control signal is switched into an off-signal (L), the transistors 61 and 62 within the monitor control circuit 60 are turned off. When the transistor 61 is turned off, the transistor 51 within the switch circuit 50 is turned off. Thus, irrespectively of the state of the power circuit 20, the power supply voltage level applied to the cathode control circuit 30 becomes L (0 V). In this way, the CRT 10 is placed in a power-off state.

On the other hand, when the transistor 62 is turned off, the transistor 64 is turned on. Thus, the transistor 41 within the power supply circuit 40 is turned off so that the output level of the transformer 42 lowers to 0 V. However, since the RC circuit 63 is arranged between the transistors 62 and 64, the transistor 64 responds later than the transistors 61 and 62 by a time T (delay time) determined by a time constant of the RC circuit 63, as shown in FIG. 2.

For this reason, even when the power control signal is switched into the off-signal (L) and hence the CRT 10 is in the off-state, the power supply circuit 40 is not turned off, but remains in the on-state for the time T. As a result, continuous application of the video signal (horizontal oscillation) to transistor 31 of the cathode control circuit 30 is maintained so that the transistor 31 continues its on-state. In the meantime, the high voltage left in the CRT 10 while the power is turned off is discharged to the ground side through the transistor 31 and the discharging circuit 70. Thus, the remaining spot due to the remaining high voltage when the power is turned off can be canceled. Incidentally, the delay time T may be set to about 20 msec, for example.

In the present invention, a concrete circuit configuration of the CRT driving circuit should not be limited to the above embodiment, but may be realized by a port control using a microcomputer, for example.

In the CRT driving circuit according to the present invention, upon application of the power-off signal to the monitor control circuit, the switch circuit arranged between the power supply circuit and cathode control circuit is turned off. Thus, the power supply voltage applied to the cathode control circuit becomes zero, and the CRT is placed in a power-off state. However, at the time of the power-off, the power supply circuit is not yet turned off. Therefore, the video circuit remains in the on-state and hence continuous application of the video signal from the video circuit to the cathode control circuit is maintained. Thus, the cathode control circuit keeps the on-state. Accordingly, the charges left in the CRT when the CRT is placed in the power-off state are discharged through the cathode control circuit in the on-state to the ground side. For this reason, the remaining spot can be canceled without shining the entire screen in white.

Since the above operation can be carried out in a manner of controlling a time axis of the video signal using a time constant circuit such as an RC circuit, the circuit configuration can be simplified. In addition, since a full white image is not used, endurance of the CRT can be enhanced.

What is claimed is:

1. A CRT driving circuit comprising:
   a cathode control circuit for amplifying a video signal created by a video circuit and supplying the amplified video signal to a cathode of a CRT;
   a power supply circuit for creating a power supply voltage for each of the cathode control circuit and the video circuit;
   a switch circuit for switching on/off the power supply voltage outputted from the power supply circuit to the cathode control circuit; and
   a monitor control circuit for on/off controlling the switch circuit and the power supply circuit on the basis of a power-on/off externally inputted signal and for switching off said power supply circuit when initially on at a delayed time following the switching off of said switch circuit when a power-off signal is inputted.

2. The CRT driving circuit according to claim 1, wherein said cathode control circuit includes a transistor with its emitter grounded.

3. The CRT driving circuit according to claim 1, wherein said power supply circuit is a switching power supply of a ringing choke converter type using a transistor and a transformer.

4. The CRT driving circuit according to claim 1, wherein said switch circuit includes a transistor with its base grounded.

5. The CRT driving circuit according to claim 1, wherein said monitor control circuit means comprises a first switching element for switching on/off the switch circuit on the basis of the power-on/off signal, a time constant circuit for delaying the power-off signal, and a second switching element for switching off from on the power supply circuit on the basis of the power-off signal.

6. The CRT driving circuit according to claim 1, further comprising a discharging circuit, provided on a ground side of the cathode control circuit, for guiding charges, discharged from the cathode of the CRT through the cathode control circuit when the switch circuit is turned off, to the ground side.

* * * * *